No. 872,167.

PATENTED NOV. 26, 1907.

F. W. BURWELL.
CAR DOOR.
APPLICATION FILED FEB. 16, 1907.

2 SHEETS—SHEET 1.

Witnesses:

Inventor
Fred W. Burwell
By James A. Norris
Attys.

No. 872,167.

PATENTED NOV. 26, 1907.

F. W. BURWELL.
CAR DOOR.
APPLICATION FILED FEB. 16, 1907.

2 SHEETS—SHEET 2.

Witnesses:
G. D. Kesler
J. B. Keefer

Inventor
Fred W. Burwell
By James L. Norris
Atty.

UNITED STATES PATENT OFFICE.

FRED W. BURWELL, OF GENEVA, OHIO.

CAR-DOOR.

No. 872,167.    Specification of Letters Patent.    Patented Nov. 26, 1907.

Application filed February 16, 1907. Serial No. 357,693.

*To all whom it may concern:*

Be it known that I, FRED W. BURWELL, a citizen of the United States, residing at Geneva, in the county of Ashtabula and State of Ohio, have invented new and useful Improvements in Car-Doors, of which the following is a specification.

This invention relates to car doors, and the object thereof is to provide, in a manner as hereinafter set forth, a car door designed for use on railway freight, refrigerator, grain, or ventilator cars, or for other purposes for which it is found applicable, and to further provide a door for such purpose with means in a manner as hereinafter referred to whereby the door is supported permanently at its top and bottom whether the door be in a position for closing the car door opening or when shifted to a position at the front or to one side of the opening.

A further object of the invention is to provide a car door in a manner as hereinafter set forth with a supporting means embodying a shifting element which when operated will swing the door clear of or at the front of the car door opening so that the door can be readily shifted to one side of the opening to enable access to the car, said means further providing for the permanently supporting of the door at the bottom to prevent the swinging of the lower end of the door when the latter is shifted to a position at the front of the car door opening or to one side of said opening.

The invention further aims to provide a car door which shall be extremely simple in its construction, strong, durable, efficient in its use, conveniently shifted, readily set up, and comparatively inexpensive to manufacture.

With the foregoing and other objects in view, the invention consists in the novel construction, combination, and arrangement of parts hereinafter more specifically described and illustrated in the accompanying drawings, wherein is shown the preferred embodiment of the invention, but it is to be understood that changes, variations, and modifications can be resorted to which come within the scope of the claims hereunto appended.

Figure 1:
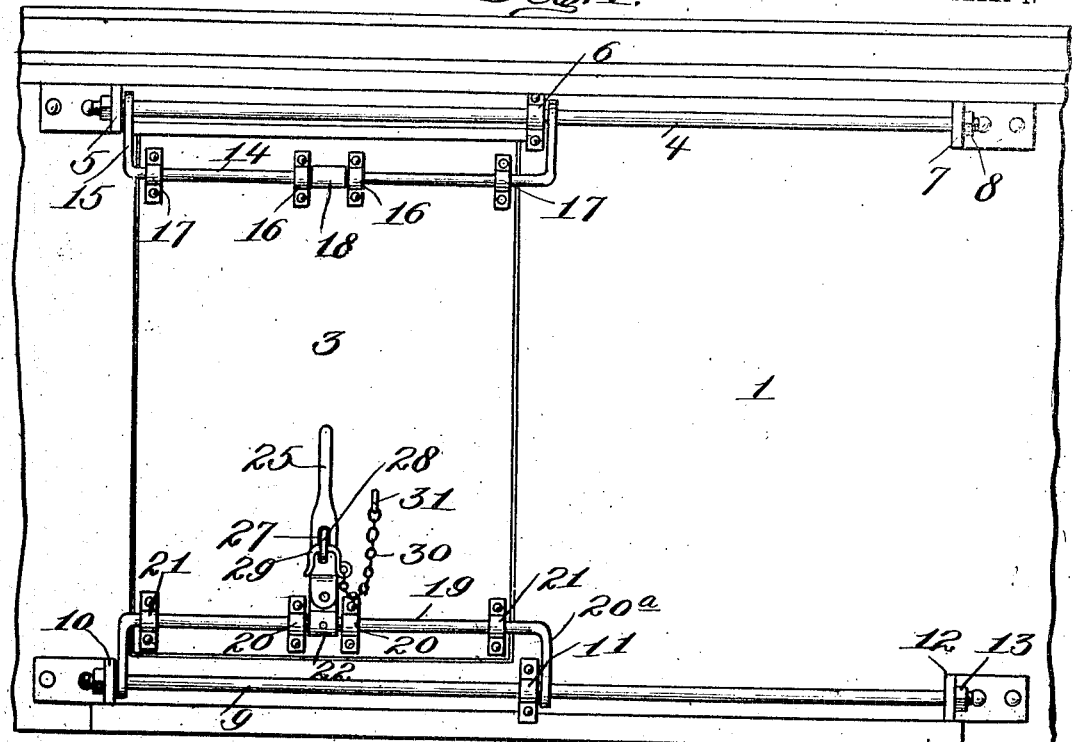
Figure 2:
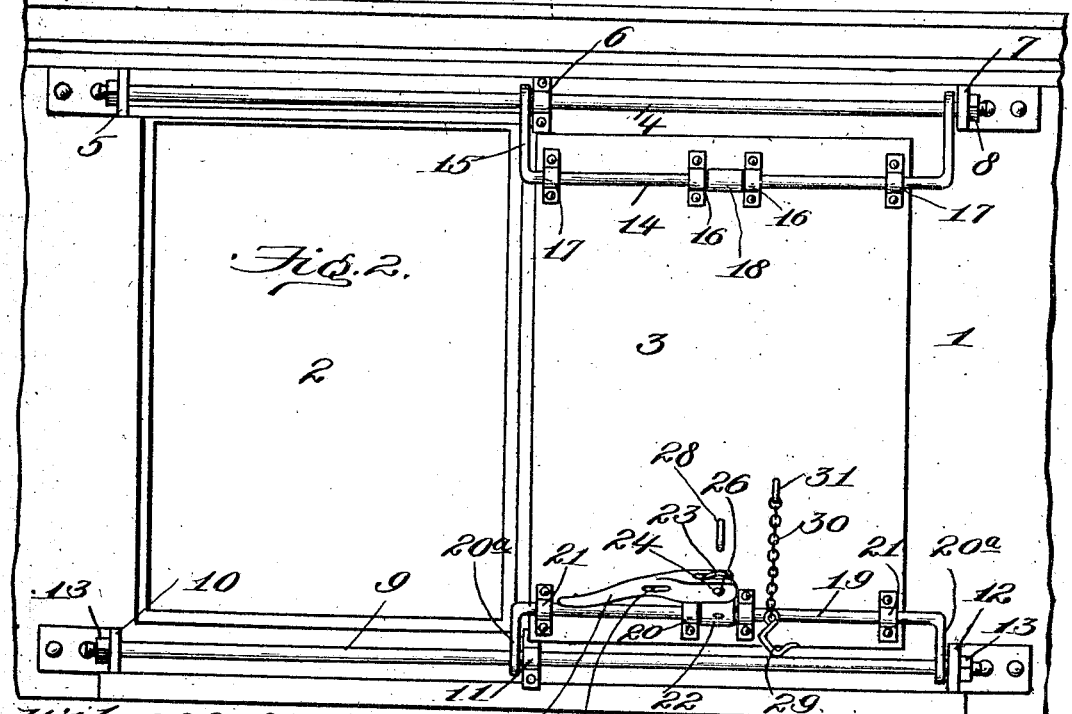
Figure 3:
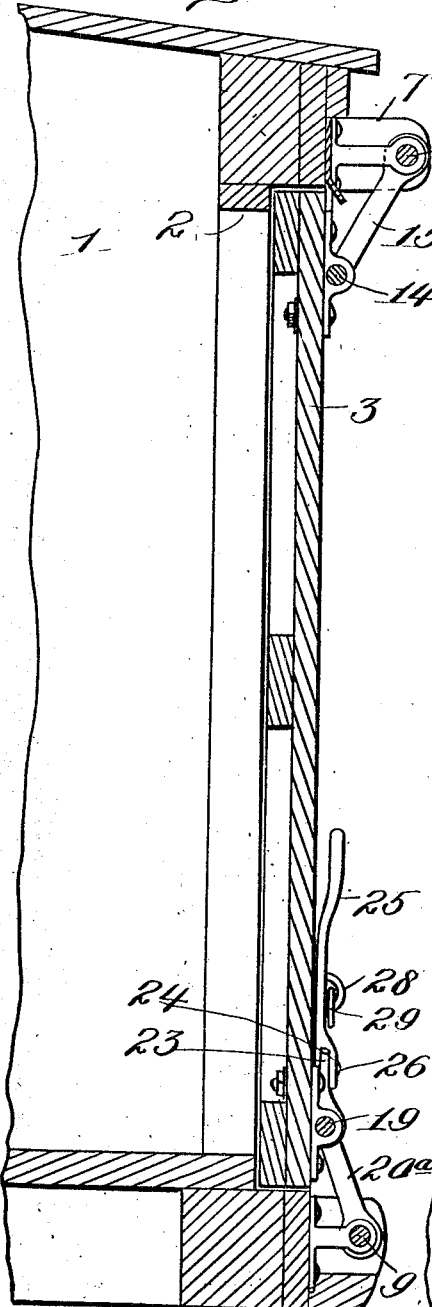
Figure 4:
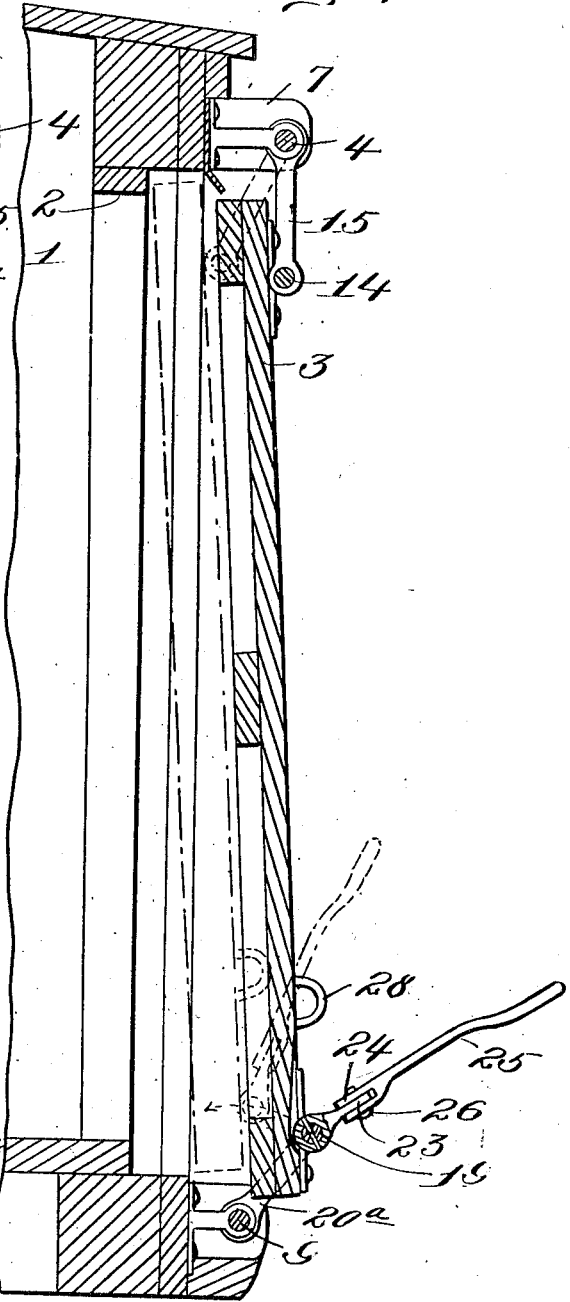

In describing the invention in detail, reference is had to the accompanying drawings wherein like reference characters denote corresponding parts throughout the several views, and in which Figure 1 is a side view of a car door in accordance with this invention showing the same in position of closing the car door opening. Fig. 2 is a like view showing the door shifted from closing position. Figs. 3 and 4 are vertical sectional views showing, respectively, the door in position in the car door opening and the door when shifted clear of the opening.

In the drawings the door as shown is what is termed a flush door, but it is evident that the door can be an outside one.

Referring to the drawings by reference characters, 1 denotes the side of a car broken away at each end and which is provided with a car door opening 2 adapted to be closed by the door 3, the latter, when in closing position, having its outer face flush with the outer face of the side of the car.

Secured to the side of the car at the top thereof so as to have a portion arranged over the opening 2 and the remaining portion projecting to one side of the top of the opening is an upper guide-rail 4 which is supported by the brackets 5, 6, and 7 and secured in position by the clamping nuts 8. The brackets 5, 6, and 7 not only constitute a support for the upper guide-rail 4, but also act as stops for limiting the shifting movement of the door in either direction; that is to say, when the door is swung to closing position, the brackets 5 and 6 act as a means to prevent the shifting of the door past the car door opening in one direction, and, when the door is shifted away from the car door opening, the brackets 6 and 7 limit such movement.

Secured to the side of the car door at the bottom thereof so as to have a portion thereof positioned below the opening 2 and the remaining portion to one side of the opening is a lower guide-rail 9 which is supported by the brackets 10, 11, and 12 and secured in position by the clamping nuts 13. The brackets 10, 11, and 12 are of less length than the brackets 5, 6, 7 so that the guide rail 9 will be supported at a less distance from the side of the car than the guide rail 4.

The door 3 is suspended from the guide-rail 4 through the medium of a suspension bail having a longitudinally extending portion 14 and a pair of upwardly and outwardly extending end portions 15, so as to form the suspension bail of a substantial U-shape. The end portions 15 of the suspension bail are apertured so that the bail can be loosely mounted upon the guide-rail 4. It will also be noted that the terminals 15 are connected to guide rail 4 at a point to one side of the door 3. The longitudinally extending portion of the suspension bail is pivotally connected to the outer face of the door 3 through the medium of the keepers 16, 17, and the said longitudinally extending portion 14 of the suspension bail is enlarged, as at 18, between the keepers 16, so as to prevent longitudinal shifting of the suspension bail through the keepers 16, 17 when the bail is connected to the door 3.

The lower end of the door 3 is supported upon the guide-rail 9 through the medium of a supporting bail formed of a longitudinally extending portion 19 and a pair of outwardly depending portions 20$^a$. By such construction the supporting bail is of inverted U-shape. The depending portions 20$^a$ are of less length than the end portions of the suspension bail and apertured so as to loosely mount the supporting bail upon the guide-rail 9. The longitudinally extending portion 19 is pivotally connected to the outer face of the door 3 by the keepers 20 and 21, and surrounding said longitudinally extending portion 19 approximately centrally thereof is a collar 22 which is suitably fixed to the longitudinally extending portion 19 and formed with a protuberance 23 which extends in the bifurcated end 24 of a shifting arm 25 for the supporting bail. The protuberance 23 is pivotally connected to the bifurcated end of the arm 25, as at 26. The collar 22 also acts as a means to prevent the supporting bail from longitudinally shifting through the keepers 20 and 21. The shifting arm 25 is formed with an opening 27 adapted to take over a staple 28 secured to the car door 3, and through the staple 28 a suitable retaining pin 29 may extend so as to secure the arm 25 in an upright position. The pin 29 may be carried by a chain 30 secured to the car door 3, as at 31. Other means, however, of securing the arm 25 in an upright position can be employed than that as shown.

It will be evident that, owing to the connecting of the top of the door to the guide-rail by the suspension bail and the supporting of the bottom of the door upon the guide-rail 9 by the supporting bail when the door is swung clear of the opening 2 and shifted to one side of said opening, the bottom of the door will be prevented from swinging inwardly or outwardly so as not to batter the side wall of the car or injure the door.

It will be assumed that the door is in the position shown in Figs. 1 and 3 and it is desired to remove it from such position. The retaining pin 29 is released and the arm 25 pulled in a direction away from the door, which will rock the supporting bail upon the guide-rail 9 and cause such bail and the suspension bail to assume the position shown in full lines in Fig. 4; consequently moving the door to a position in front and clear of the car door opening; the door can then be shifted upon the guide-rails 4 and 9 to the position shown in Fig. 2. When it is desired to close the door, it is moved from the position shown in Fig. 2 to a point in front of the car door opening; the arm 25 is then swung towards the door, which will rock the supporting bail inwardly and cause the door to assume the position shown in Figs. 1 and 3.

It is obvious that a door suspended in accordance with this invention may be adjusted angularly, as shown in Fig. 4 of the accompanying drawings. If occasion requires, the position of the door disclosed in Fig. 4 may be reversed, that is, the lower end of the door will engage the sill and the upper end will be disposed at an angle so as to leave a small opening between the door and the frame of the car.

What I claim is:

1. The combination with a car having a door-opening and a door adapted to be seated in said opening, of a pair of guide rails, one arranged above and the other below the door opening, the guide rail above the opening supported at a greater distance from the car than the other rail, and a pair of bails having angular ends pivotally connected to the door and connected to and mounted to oscillate upon said rails, the angular ends of the bail which are mounted upon the upper rail being longer than the angular ends of the other bail.

2. The combination with a car having a door opening and a door adapted to be seated in said opening, of a pair of guide rails, one arranged above and the other below the car door opening, the guide rail above the opening supported at a greater distance from the car than the other rail, and a pair of bails having angular ends pivotally connected to the door and connected to and mounted to oscillate upon said rails, the angular ends of the bail which are mounted upon the upper rail being longer than the angular ends of the other bail, one of said bails arranged in close proximity to the top of the door and the other of said bails in close proximity to the bottom of the door.

3. The combination with a car having a door opening and a door adapted to be seated in said opening, of a pair of guide rails, one arranged above and the other below the door opening, the guide rail above the opening supported at a greater distance from the car than the other rail, a pair of bails having angular ends pivotally connected to the door and connected to and mounted to oscillate upon said rails, the angular ends of the bail which are mounted upon the upper rail being longer than the angular ends of the other bail, and means connected to the lower of said bails whereby said bails can be shifted upon said rails causing thereby the withdrawing of the door from said opening.

4. The combination with a car having a door opening and a door adapted to be seated in said opening, of a pair of fixed guide rails, one arranged above and the other below the car door opening, the guide rail above the opening supported at a greater distance from the car than the other rail, a pair of bails having angular ends pivotally connected to the door and permanently connected to and mounted to oscillate upon said rails, the angular ends of the bail which are mounted upon the upper rail being longer than the angular ends of the other bail, one of said bails arranged in close proximity to the top of the door and the other of said bails in close proximity to the bottom of the door, and means connected to the lower of said bails whereby said bails can be shifted upon said rails causing thereby the withdrawing of the door from said opening.

5. The combination with a car having a door opening and a door adapted to be seated in said opening, of a pair of fixed guide rails, one arranged above and the other below the door opening, the guide rail above the opening supported at a greater distance from the car than the other rail, a pair of end and an intermediate supporting bracket for each of said rails, and a pair of bails having angular ends pivotally connected to the door and connected to and mounted to oscillate and slide upon said rails, the angular ends of the bail which are mounted upon the upper rail being longer than the angular ends of the other bail, said bails when shifted upon said rails carrying the door therewith and preventing the door from swinging out at its top or its bottom, the angular ends of the bails being on opposite sides of the intermediate brackets and the opposite angular ends of each bail engaging the intermediate and the end bracket at the limit of movement in either direction of the door when shifted and further preventing the shifting of the door off the rails.

6. The combination with a door, of a pair of fixed guide rails, one arranged above and the other below the door, said rails being out of vertical alinement, and a pair of bails having angular ends pivotally connected to the door and connected to and mounted to oscillate and slide upon said rails, the angular ends of the bail which are mounted upon the upper rail being longer than the angular ends of the other bail, one of said bails arranged in close proximity to the top of the door and the other of said bails in close proximity to the bottom of the door, and means connected to the lower of said bails, whereby said bails can be shifted upon said rails causing thereby the withdrawing of the door from the door opening.

7. The combination with a car, of a pair of fixed guide rails, one arranged above and the other below the door, said rails being out of vertical alinement, and a pair of bails having angular ends pivotally connected to the door and permanently connected to and mounted to oscillate and slide upon said rails, the angular ends of the bail which are mounted upon the upper rail being longer than the angular ends of the other bail, one of said bails arranged in close proximity to the top of the door and the other of said bails in close proximity to the bottom of the door, means connected to the lower of said bails, whereby said bails can be shifted upon said rods causing thereby the withdrawing of the door from a door opening, and a pair of end brackets and an intermediate supporting bracket for each of said guide rods, the angular ends of the bails being on opposite sides of the intermediate brackets and the opposite angular ends of each bail engaging the intermediate and an end bracket at the limit of movement in either direction of the door when shifted and further preventing the shifting of the door off the rails.

8. The combination with a door, of a pair of fixed guide rails one arranged above and the other below the door, the said rails being out of vertical alinement, a pair of bails having angular ends, said bails pivotally and permanently connected to the door and having their angular ends provided with eyes whereby said bails are permanently connected to and mounted to oscillate and slide upon said rails, the angular ends of the bail which are mounted upon the upper rail being longer than the angular ends of the other bail, one of said bails arranged in close proximity to the top of the door and the other of said bails arranged in close proximity to the bottom of the door, and means connected to the lower of said bails whereby said bails can be shifted upon said rails causing thereby the withdrawing of the door from a door opening and allowing of the bails to be shifted towards one end of the said rails.

9. The combination with a door, of a pair of fixed guide rails one arranged above and the other below the door, said rails out of vertical alinement, a pair of bails having angular ends, said bails pivotally and permanently connected to the door and having their angular ends provided with eyes whereby said bails are permanently connected to and mounted to oscillate and slide upon said rails, the angular ends of the bail which are mounted upon the upper rail being longer than the angular ends of the other bail, one of said bails arranged in close proximity to the top of the door and the other of said bails arranged in close proximity to the bottom of the door, means connected to the lower of said bails whereby said bails can be shifted upon said rails causing thereby the withdrawing of the door from a door opening and allowing of the bails to be shifted towards one end of the said rails, and a pair of end brackets and an intermediate supporting bracket for each of said guide rails, the angular ends of the bails being on opposite sides of the intermediate brackets and the opposite angular ends of each bail engaging the intermediate and an end bracket at the limit of movement in either direction of the door when shifted and further preventing the shifting of the door off the rails.

In testimony whereof I have hereunto set my hand in presence of two subscribing witnesses.

FRED W. BURWELL.

Witnesses:
B. H. ADAMS,
F. A. ALLEN.